United States Patent [19]

Oversluizen et al.

[11] Patent Number: 4,798,681

[45] Date of Patent: Jan. 17, 1989

[54] LUMINESCENT QUARTZ GLASS, METHOD OF PREPARING SUCH A GLASS AND LUMINESCENT SCREEN PROVIDED WITH SUCH A GLASS

[75] Inventors: Gerrit Oversluizen; Joseph G. Van Lierop; Anne-Marie A. Van Dongen, all of Eindhoven, Netherlands

[73] Assignee: U.S. Philips Corporation, New York, N.Y.

[21] Appl. No.: 105,922

[22] Filed: Oct. 7, 1987

[30] Foreign Application Priority Data

Oct. 8, 1986 [NL] Netherlands ............... 8602519

[51] Int. Cl.$^4$ ............... C03C 3/06; C03C 3/095; C09K 11/08
[52] U.S. Cl. ............... 252/301.4 F; 501/54; 501/64; 428/426; 428/432
[58] Field of Search ............... 501/54, 64; 252/301.4 F; 428/426, 432

[56] References Cited

U.S. PATENT DOCUMENTS 3,527,711 9/1970 Barber et al. ............... 501/54
4,361,779 11/1982 van der Steen et al. ............... 501/54

Primary Examiner—Mark L. Bell
Attorney, Agent, or Firm—John C. Fox

[57] ABSTRACT

Luminescent quartz glass comprising as a glass matrix oxide mainly $SiO_2$ and furthermore per mole of $SiO_2$ from 0 to 0.15 mol of at least one of the oxides $Al_2O_3$, $B_2O_3$, $P_2O_5$, $ZrO_2$, $Sc_2O_3$, $Y_2O_3$, $La_2O_3$, $Gd_2O_3$, $Lu_2O_3$, the alkali metal oxides and the alkaline earth metal oxides. The glass comprises as an activator oxide at least one of the oxides $Tb_2O_3$ and $Ce_2O_3$ in a quantity of 0.75 to 15 mol % calculated with respect to the glass matrix oxides. In one embodiment the glass comprises $Tb_2O_3$ and also not more than 0.2 mol % of $Eu_2O_3$ as an activator oxide. The glasses are preferably obtained by a sol-gel technique and are useful, for example, in luminescent screen of low-pressure mercury vapor discharge lamps.

7 Claims, 1 Drawing Sheet

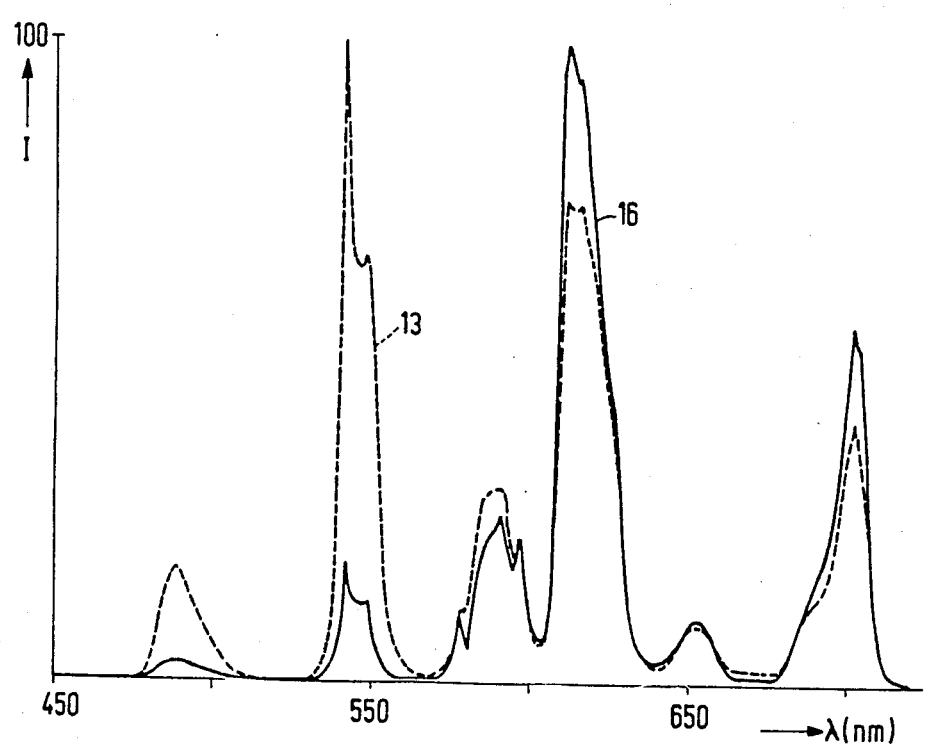

LUMINESCENT QUARTZ GLASS, METHOD OF PREPARING SUCH A GLASS AND LUMINESCENT SCREEN PROVIDED WITH SUCH A GLASS

CROSS-REFERENCE TO RELATED APPLICATIONS

U.S. patent application Ser. Nos. 105,921 and 105,923, respectively, both filed simultaneously herewith, relate to luminescent alumino-silicate and alumino-borate glasses, and to luminescent quartz glasses prepared from a melt, respectively.

BACKGROUND OF THE INVENTION

The invention relates to a luminescent quartz glass activated by a rare earth metal and comprising as a glass matrix oxide: mainly $SiO_2$; and furthermore 0 to 0.15 mol of MO per mol of $SiO_2$, in which MO represents at least one of the oxides $Al_2O_3$, $B_2O_3$, $P_2O_5$, $ZrO_2$, $Sc_2O_3$, $Y_2O_3$, $La_2O_3$, $Gd_2O_3$, $Lu_2O_3$, the alkali metal oxides and the alkaline earth metal oxides. The invention also relates to a method of preparing such a luminescent quartz glass and to a luminescent screen provided with such a luminescent quartz glass.

Luminescent quartz glasses have been known for a comparatively long time. U.S. Pat. Nos. 3,527,711, 3,634,711, 3,855,144 and 3,935,119, for example, describe such glasses whose $SiO_2$ content is very high (generally at least 99% by weight) and in which preferably rare earth metals are used as activators. These rare earth metal activators are used in very low concentrations with a maximum concentration of 5000 ppm (rare earth metal atoms relative to Si atoms) being stated. Also if a plurality of rare earth metals is used as an activator, the concentration of all activators combined is not to exceed this maximum value and preferably the limit of 2000 ppm is not exceeded. Expressed in mol.% of the (trivalent) rare earth metal oxide relative to $SiO_2$, the said limits of 5000 and 2000 ppm are 0.25 and 0.1 mol%, respectively. In the above cited patents it is stated that less transparent products are obtained when the given maximum values of the activator concentration are exceeded. Less transparent and coloured luminescent materials have the drawback of a too low luminous flux so that they are not usable in practice.

U.S. Pat. No. 3,459,673 describes a method of preparing a quartz glass activated by rare earth metals in which the starting material is a hydrolysable silicon compound and an aqueous solution of a salt of a rare earth metal soluble in water. Also in this publication very low activator concentrations are stated (in the examples, concentrations of the order of several hundred ppm are used).

A luminescent quartz glass of the type described in the opening paragraph is known from Netherlands patent application No. 6605957. In this application a terbium-activated glass is described whose glass matrix, that is to say, the glass composition without an activator oxide, mainly consists of $SiO_2$ but also comprises up to approximately 0.20 mol per mol of $SiO_2$ of other oxides mentioned by name. According to this patent application the addition of these other oxides renders a higher terbium concentration possible. The maximum concentration is, however, only 0.5 mol% of $Tb_2O_3$ per mol of $SiO_2$, that is to say, only a factor of 2 higher than the maximum concentration in the aforementioned United States patents.

A great drawback of the known luminescent quartz glasses is that they have a low efficiency compared with crystalline luminescent materials. Particularly the quantum efficiency upon excitation by ultraviolet radiation is often found to be a factor of 5 to 10 smaller than the quantum efficiencies which can be achieved with efficient crystalline materials.

The object of the invention is to provide luminescent quartz glasses having high conversion efficiencies and notably high quantum efficiencies upon excitation by ultraviolet radiation.

SUMMARY OF THE INVENTION

According to the invention a luminescent quartz glass of the type described in the opening paragraph is therefore characterized in that the glass comprises at least one of the oxides $Tb_2O_3$ and $Ce_2O_3$ as activator oxides in a quantity of 0.75 to 15 mol% calculated with respect to the glass matrix oxides.

The invention is based on the recognition that the rare earth metals Tb and Ce, when used as activators in quartz glasses, have an optimum effect if they are used in a concentration range which is much higher than the range hitherto assumed to be optimum. The activator concentration in the quartz glasses according to the invention to chosen to be of the same order as the concentration in crystalline luminescent materials and it has been found that upon excitation by ultraviolet radiation efficiencies can be achieved which are comparable with those of the crystalline materials. A condition is that the glass matrix is transparent to the exciting ultraviolet radiation because otherwise excitation energy is lost due to absorption in the matrix itself, and that the glass is free from impurities to a great extent. In addition to the transparent $SiO_2$ the matrix may comprise from 0 to 0.15 mol per mol of $SiO_2$ of the oxides indicated by MO, all of which are transparent to ultraviolet radiation. In this description and the claims, the alkali metals are understood to be the elements Li, Na, K, Rb and Cs and the alkaline earth metals are understood to be the elements Mg, Ca, Sr, Ba and Zn.

In the luminescent quartz glasses according to the invention, useful absorption of exciting radiation is effected in the activators Tb and/or Ce. To this end the quartz glass comprises at least 0.75 mol% of $Tb_2O_3$ and/or $Ce_2O_3$ with respect to the glass matrix oxides. At lower contents a very low luminous flux is obtained because it has been found that the absorption of the exciting radiation is then too small. The content of the activator oxides is chosen to be equal to at most 15 mol% because at higher values a too low luminous flux is obtained, again due to so-called concentration quenching. Quartz glasses with the characteristic green-line emission of $Tb^{3+}$ (maximum at approximately 540 nm) are obtained upon activation by terbium and upon activation by cerium an emission of $Ce^{3+}$ is obtained in a band in the blue to near-ultraviolet part of the spectrum. When using both Ce and Tb there is a transfer of excitation energy from the Ce to the Tb.

The addition to the glass matrix mainly comprising $SiO_2$ of one or more of the transparent oxides of the elements Al, B, P, Zr, Y, La, Gd, Lu, the alkali metals and the alkaline earth metals (up to not more than 0.15 mol per mol of $SiO_2$) is not necessary to obtain the desired high activator concentration. Such an addition may have the advantage that the glass formation proceeds more easily when preparing the quartz glass and can be effected at notably lower temperatures.

Quartz glasses according to the invention comprising from 1 to 7 mol% of $Tb_2O_3$ and/or $Ce_2O_3$ are preferred because the highest luminous fluxes are then obtained.

In a further preferred embodiment of a luminescent quartz glass according to the invention the glass comprises from 0.5 to 5 mol of $Al_2O_3$ per mol of $Tb_2O_3$ and/or $Ce_2O_3$. In fact it has been found that addition of $Al_2O_3$ in these quantities is conducive to maintaining or obtaining the desired valency (trivalent) of the activators incorporated in the glass matrix. This particularly applies to cerium.

A very advantageous embodiment of a luminescent quartz glass according to the invention is characterized in that the glass comprises from 0.75 to 15 mol% of $Tb_2O_3$ and furthermore $Eu_2O_3$ as an activator oxide in a quantity of not more than 0.2 mol% calculated with respect to the glass matrix oxides. It was surprisingly found that the $Tb^{3+}$ in the luminescent quartz glasses transfers the excitation energy very satisfactorily to $Eu^{3+}$ which then luminesces efficiently. It was found that very small quantities of $Eu_2O_3$ already yield a contribution of the characteristic red-line emission of $Eu^{3+}$. When using 0.0005 mol% of $Eu_2O_3$ the glass still luminesces predominantly green ($Tb^{3+}$ emission) but the red $Eu^{3+}$ emission is already noticeable. With increasing $Eu_2O_3$ contents the $Eu^{3+}$ emission increases and the $Tb^{3+}$ emission decreases so that luminescent glasses can be obtained with emission colours in the entire range of green to predominantly red. Notably very efficient yellow luminescing quartz glasses are possible which have great advantages for practical uses.

It is to be noted that the use of $Eu_2O_3$ only as an activator oxide in both high and in low concentrations does not lead to efficiently luminescent glasses because it has been found that upon direct excitation in the $Eu^{3+}$ very low quantum efficiencies are obtained.

Therefore relatively high $Tb_2O_3$ contents according to the invention are chosen in order to absorb the excitation energy and to obtain the desired emission colour. At a relatively low $Eu_2O_3$ content of 0.05 mol% this emission colour is already predominantly red. $Eu_2O_3$ contents of more than 0.2 mol% are not used because then too small quantum efficiencies are obtained due to competitive absorption in $Eu^{3+}$.

Quartz glasses activated by both $Tb^{3+}$ and $Eu^{3+}$ and comprising not more than 0.01 mol of MO per mol of $SiO_2$ are preferred because it has been found that the transfer from $Tb^{3+}$ to $Eu^{3+}$ proceeds very efficiently in these glasses.

The best results are obtained with the $Tb^{3+}$ and $Eu^{3+}$ activated quartz glasses if the glass comprises from 2 to 7 mol% of $Tb_2O_3$ and from 0.001 to 0.05 mol% of $Eu_2O_3$. Such glasses are therefore preferred.

The luminescent quartz glasses according to the invention can generally be obtained by heating a starting mixture of the composite oxides (with a high degree of purity) or of compounds yielding these oxides upon elevated temperatures in a furnace at a very high temperature until at least the melting point is reached. The melting point is dependent on the composition and, for example, if $Al_2O_3$ is used in a quantity of 0.02 to 0.10 mol per mol of $SiO_2$, it is at approximately 2200° C. During heating of the mixture, which is preferably placed in a molibdenum crucible, a reducing gas is passed through the furnace to obtain or maintain the Tb and/or Ce in a trivalent state. The melt is maintained at a high temperature some time and is subsequently cooled.

The luminescent quartz glasses activated by terbium or by terbium and europium are preferably prepared by a method in which an alcoholic solution of an alkoxysilane is made, to which: Tb is added in a quantity of 0.015 to 0.30 mol per mol of Si, to which Eu is added in a quantity of not more than 0.004 mol per mol of Si; and furthermore to which one or more of the elements Al, B, P, Zr, Sc, Y, La, Gd, Lu, the alkali metals and the alkaline earth metals are added in a quantity corresponding to 0 to 0.15 mol of oxide of these elements per mol of Si, and in the form of an alcoholic solution of at least one compound from the group of alkoxides, nitrates, carbonates and acetates of the said elements; containing water is added in such a quantity that gelation occurs. The gel subsequently obtained is dried, and the dried gel is heated to a temperature of 50° to 1200° C.

This method according to the invention uses a technique which is known per se for the formation of glasses having a high $SiO_2$ content and which is commonly referred to as sol-gel technique. An alcoholic solution of an alkoxysilane is initially used. Very suitable starting materials are tetramethoxysilane and tetraethoxysilane, dissolved in alcohols, preferably methanol and ethanol, respectively. The desired quantity of Tb and possibly Eu and the desired quantity of the elements to be incorporated in the glass matrix as oxides in addition to $SiO_2$ are added to the said solution in the form of an alcoholic solution of alkoxides, nitrates, carbonates and/or acetates of the relevant elements. Furthermore water is added, preferably in a quantity which is sufficient to hydrolyse, the silane completely. Due to the hydrolysis a sol is produced which condenses after a certain time so that a gel is formed. The gel obtained is dried and is subsequently heated to a temperature of 500° to 1200° C. so that a glass having a very homogeneous composition is obtained. When using tetraethoxysilane, for example, a solution is prepared which comprises preferably at least 1 mol of silane per liter of ethanol and to which at least 2 mol of water are added per mol of silane in order to ensure complete hydrolysis. The method according to the invention has great advantages over the method in which the starting mixtures are composite oxides. In fact, a very homogeneous product of a high purity is obtained and the required heating step can be performed at a comparatively low temperature (500°-1200°).

Preferably, one or more of the alcoholic solutions are brought to a pH value of less than 7 by means of an acid, and the mixture of solutions is brought to a pH value of more than 7 by the addition of a volatile base so that the gelation is accelerated. The use of an acid promotes the required hydrolysis and the use of a base accelerates the subsequent condensation to a gel. If aqueous solutions of an acid and/or a base are used, the quantity of water added therewith also counts for the quantity of water required for the hydrolysis.

Due to their high quantum efficiencies, the luminescent quartz glasses according to the invention can be used instead of crystalline luminescent materials. Due to their favourable possibilities of processing and shaping, the quartz glasses may also be used in luminescent glass fibres. A possible use is also found in cathode ray tubes and in solid-state lasers.

The luminescent quartz glasses according to the invention are preferably used in a luminescent screen which is provided with a luminescent layer comprising the glass and which can be provided on a support. Such screens are used in, for example, discharge lamps such as low-pressure mercury vapour discharge lamps.

BRIEF DESCRIPTION OF THE DRAWING

The invention will now be described in greater detail with reference to a number of embodiments of luminescent quartz glasses and methods according to the invention and by way of the accompanying drawing.

The drawing shows in a graph the spectral energy distribution of the emitted radiation of two quartz glasses according to the invention.

DESCRIPTION OF THE PREFERRED EMBODIMENTS

Example 1

An intimate mixture was made of 1 mol of $SiO_2$ and 0.02 mol of $CeAlO_3$. This mixture was heated to 2200° C. in a molydenum crucible in a high-frequency furnace. The molten mixture was maintained at this temperature for 1 hour. During heating a reducing gas (He with 10% by volume of $H_2$) was passed through the furnace. Subsequently the melt was cooled. The quartz glass obtained was broken and ground. The pulverulent product ($SiO_2$ comprising per mol 0.01 mol of $Ce_2O_3$ and 0.02 mol of $Al_2O_3$) was found to have a quantum efficiency q=43% upon excitation by 254 nm radiation (absorption A=76%). The emission consisted of a band with a maximum at approximately 410 nm.

Example 2

Starting from a mixture of 1 mol of $SiO_2$, 0.01 mol of $CeO_2$, 0.03 mol of $Tb_2O_3$ and 0.07 mol of $Al_2O_3$, the same method as described in example 1 was carried out. The glass obtained ($SiO_2$ with 0.005 mol of $Ce_2O_3$, 0.03 mol of $Tb_2O_3$ and 0.07 mol of $Al_2O_3$ per mol of $SiO_2$) had a quantum efficiency q=48% upon 254 nm excitation (A=63%) The emission predominantly consisted (>95%) of the characteristic $Tb^{3+}$ radiation.

Example 3

A solution was made of 1 mol of $Si(OC_2H_5)_4$ in 4 mol of $C_2H_5OH$. 10 mols of water were added to this solution whereafter it was heated at 50° C. for some time. Subsequently a solution of 0.06 mol of $Tb(NO_3)_3.5H_2O$ in 2 mols of $C_2H_5OH$ was added to the solution while stirring. Due to hydrolysis and condensation gelation occurred. The gelation time was found to be approximately two weeks. The gel obtained was dried and then heated in air at 850° C. After cooling the product was ground so that a fine glass powder consisting of very pure $SiO_2$ and 3 mol% of $Tb_2O_3$ was obtained. Upon excitation by short-wave ultraviolet radiation (254 nm) the glass was found to have a quantum efficiency of 66%. The absorption A of the exciting radiation was 81%. The emission consisted of the characteristic $Tb^{3+}$ radiation.

Example 4

The method of example 3 was repeated, except that instead of 6 mols of water, 108 g of a 0.1N HCl solution in water (6 mols of water) were added. The gelation took approximately 4 days in this case. The product obtained was substantially equal to that of example 3. A=80% and q=96% were measured.

Example 5

A solution was made of 1 mol of $Si(OC_2H_5)_4$ in 4 mols of $C_2H_5OH$. 36 g of a 0.1N HCl solution in water (2 mols of water) were added to this solution whereafter it was heated at 50° C. for half an hour while stirring. A solution of 0.06 mol of $Tb(NO_3)_3.5H_2O$ in 2 mols of $C_2H_5OH$ was added to the clear solution thus obtained. After approximately 10 minutes of stirring 4 mols of a solution of $NH_4OH$ in water (pH=12) were added, whereafter gelation occurred rapidly, (and was substantially complete after approximately 10 minutes. The gel formed was dried and subsequently heated in air at 850° C. for ¼ hour. The granular mass obtained was ground for approximately 15 minutes so that a fine glass powder was obtained (very pure $SiO_2$ with 3 mol% of $Tb_2O_3$) which was ready for use. Upon 254 nm excitation (A=59%) the powder was found to have a quantum efficiency q of 79%.

Examples 6 to 11

Analogously as described in example 5, six luminescent quartz glasses having different compositions were obtained. In these examples, however, the heat treatment was performed for ¼ hour in air at 900° C. The following Table states the composition of these glasses as well as the results of the measurements of absorption A of the exciting 254 nm radiation and quantum efficiency q. In the examples 9, 10 and 11, K and Na, respectively, were added as ethanolates.

| Example | Composition | A (%) | q (%) |
|---------|-------------|-------|-------|
| 6 | 1 $SiO_2$.0.05 $Tb_2O_3$ | 63 | 59 |
| 7 | 1 $SiO_2$.0.06 $Tb_2O_3$ | 34 | 32 |
| 8 | 1 $SiO_2$.0.07 $Tb_2O_3$ | 65 | 36 |
| 9 | 0.97 $SiO_2$.0.03 $K_2O$.0.03 $Tb_2O_3$ | 80 | 80 |
| 10 | 0.92 $SiO_2$.0.08 $Na_2O$.0.05 $Tb_2O_3$ | 56 | 72 |
| 11 | 0.85 $SiO_2$.0.125 $Na_2O$.0.05 $Tb_2O_3$ | 68 | 71 |

Examples 12 to 19

Analogously as described in example 5, eight luminescent quartz glasses were obtained all of which comprised 5 mol% of $Tb_2O_3$ and different quantities of $Eu_2O_3$ in accordance with the formula $1SiO_2.0.05Tb_2O_3 .xEu_2O_3$. Heating in air was, however, performed at 900° C. The following Table states for each example the value of the $Eu_2O_3$ content x as well as the measured values of absorption A of the exciting 254 nm radiation, the quantum efficiency q, and the % share of red $Eu^{3+}$ emission.

| Ex. | x | A (%) | q (%) | $Eu^{3+}$-em (%) |
|-----|---|-------|-------|------------------|
| 12 | 0.000015 | 69 | 46 | 37 |
| 13 | 0.000035 | 71 | 58 | 53 |
| 14 | 0.00005 | 66 | 54 | 69 |
| 15 | 0.00009 | 70 | 46 | 80 |
| 16 | 0.00028 | 66 | 49 | 89 |
| 17 | 0.00054 | 81 | 33 | 91 |
| 18 | 0.00107 | 70 | 34 | 97 |
| 19 | 0.00196 | 77 | 23 | 97 |

The emission spectra of the quartz glasses according to examples 13 and 16 are shown in the drawing as a graph in which the wavelength λ is plotted in nm on the horizontal axis. The photon current I is plotted in arbitrary units on the vertical axis. The maximum photon current is set at 100 for both curves. The emission of the glass according to example 13 is yellow to the eye. That of the glass according to example 16 is predominantly red.

Example 20

A quartz glass defined by the formula $1SiO_2.0.075Tb_2O_3.0.0003 Eu_2O_3$ was prepared in a manner as described in example 5. Upon excitation by 254 nm radiation (A=85%) a quantum efficiency q of 52.5% was measured. 91% of the emitted radiation consisted of the red $Eu^{3+}$ emission.

What is claimed is:

1. A luminescent quartz glass activated by a rare earth metal and consisting essentially of glass matrix oxides: $SiO_2$ and from 0 to 0.15 mol of MO per mol of $SiO_2$ in which MO represents at least one of the oxides selected from the group consists of $Al_2O_3$, $B_2O_3$, $P_2O_5$, $ZrO_2$, $Sc_2O_3$, $Y_2O_3$, $La_2O_3$, $Gd_2O_3$, $Lu_2O_3$, the alkali metal oxides and the alkaline earth metal oxides,
   characterized in that the glass further consists essentially of at least one of the oxides selected from the group consisting of $Tb_2O_3$ and $Ce_2O_3$ as activator oxides in a quantity of 1 to 15 mol% calculated with respect to the glass matrix oxides.

2. A luminescent quartz glass as claimed in claim 1 in which $Tb_2O_3$ and/or $Ce_2O_3$ are present up to 7 mol%.

3. A luminescent quartz glass as claimed in claim 1, characterized in that the glass further consists essentially of from 0.5 to 5 mol of $Al_2O_3$ per mol of $Tb_2O_3$ and/or $Ce_2O_3$.

4. A luminescent quartz glass as claimed in claim 1, characterized in that the glass furthermore consists essentially of $Eu_2O_3$ as an activator oxide in a quantity of not more than 0.2 mol% calculated with respect to the glass matrix oxides.

5. A luminescent quartz glass as claimed in claim 4 in which MO is present in the amount of up to 0.01 mol of MO per mol of $SiO_2$.

6. A luminescent quartz glass as claimed in claim 4 in which $Tb_2O_3$ is present from 2 to 7 mol % and $Eu_2O_3$ is present from 0.001 to 0.05 mol %.

7. A luminescent screen provided with a luminescent layer comprising a luminescent quartz glass as claimed in claim 1.

* * * * *